United States Patent [19]

Okamura et al.

[11] 4,358,070
[45] Nov. 9, 1982

[54] MAGNETIC TAPE CASSETTE

[75] Inventors: Masatoshi Okamura; Kimio Tanaka, both of Tokyo, Japan

[73] Assignee: TDK Electronics Co., Ltd., Tokyo, Japan

[21] Appl. No.: 212,550

[22] Filed: Dec. 3, 1980

[30] Foreign Application Priority Data

Jan. 28, 1980 [JP] Japan .............................. 55-8773[U]

[51] Int. Cl.$^3$ .......................... G03B 1/04; G11B 15/32
[52] U.S. Cl. ...................................... 242/197; 242/199
[58] Field of Search ........................ 242/194, 197–200; 206/389; 360/93, 96.1–96.6, 132; 220/334, 348

[56] References Cited

U.S. PATENT DOCUMENTS

| | | | |
|---|---|---|---|
| 3,980,255 | 9/1976 | Serizawa | 242/198 |
| 4,083,472 | 4/1978 | Wharam | 220/334 |
| 4,173,319 | 11/1979 | Umeda | 242/199 |
| 4,180,220 | 12/1979 | Shiba et al. | 242/199 |
| 4,235,395 | 11/1980 | Wardenaar et al. | 242/199 |

Primary Examiner—Leonard D. Christian
Attorney, Agent, or Firm—Oblon, Fisher, Spivak, McClelland & Maier

[57] ABSTRACT

A magnetic tape cassette comprises a tape running plane for a magnetic tape provided in the front of the casing assembly consisting of an upper half casing and a lower half casing, said magnetic tape being held in wound form and being capable of running inside the casing assembly and a front cover mounted to the casing assembly so as to open and close at the front of the assembly, said front cover being actuated by spring action in the direction closing the front part of the casing assembly by positioning one end of a coil spring fitted to the pivot pin in a rectangular groove formed in an inner surface of the upper half casing, wherein a rib having a slanted surface which is lowered toward said groove is provided at the side of said groove.

3 Claims, 9 Drawing Figures

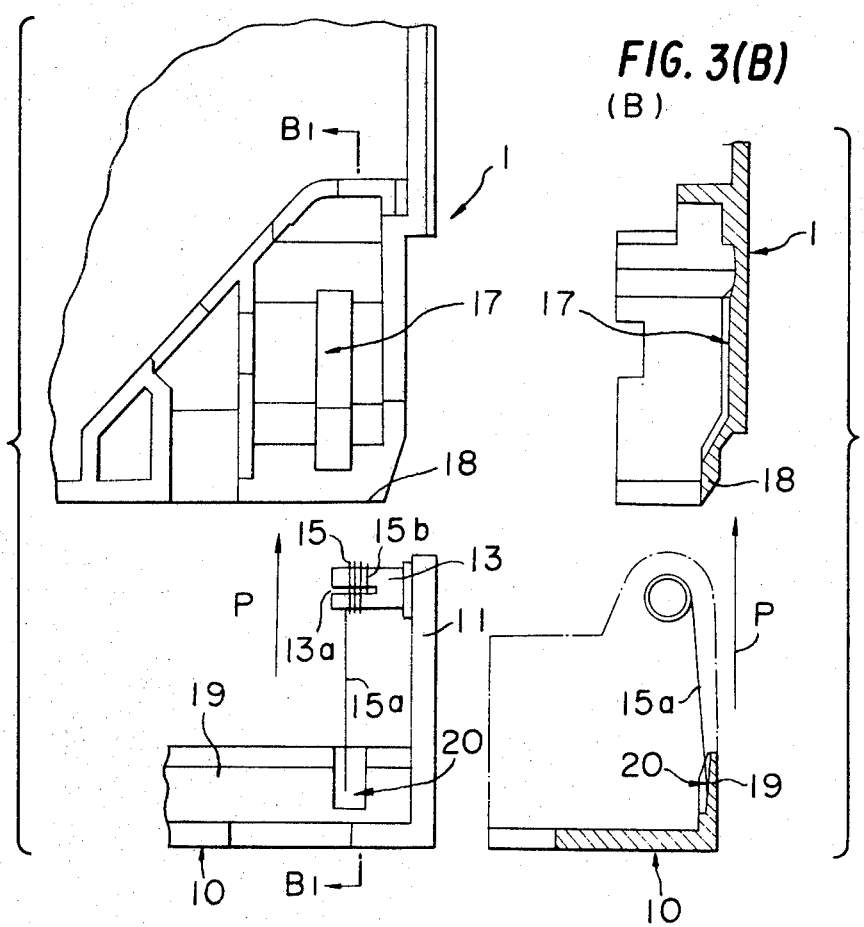
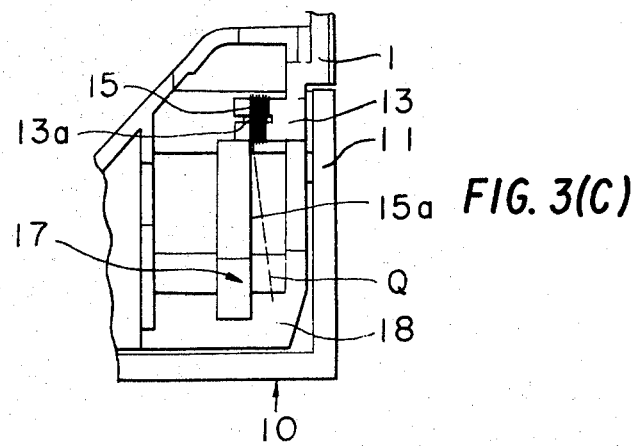

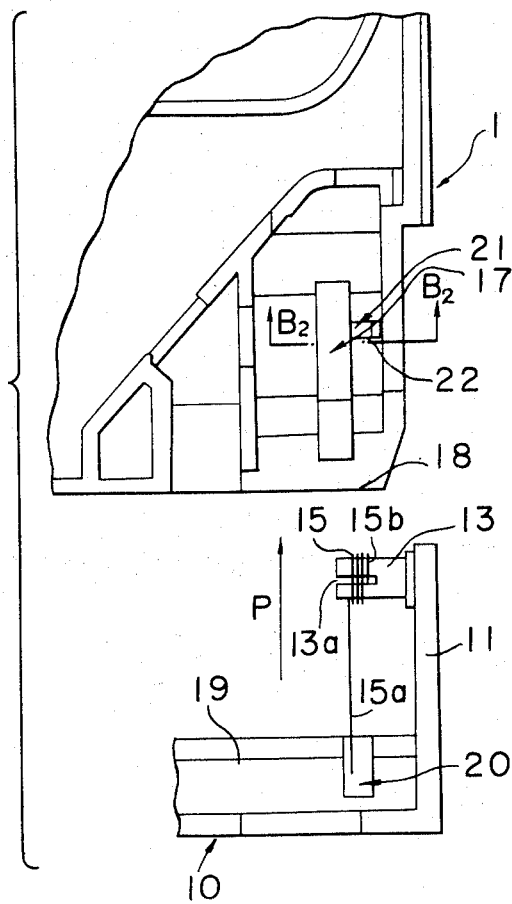
FIG. 4(A₁)
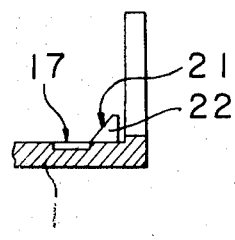
FIG. 4(B₁)
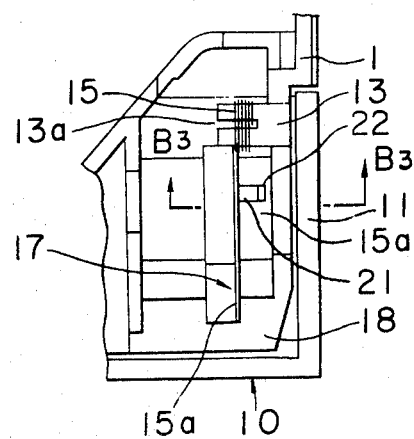
FIG. 4(B₂)
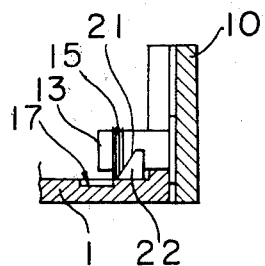
FIG. 4(B₂)

MAGNETIC TAPE CASSETTE

BACKGROUND OF THE INVENTION

1. Field of the Invention

The present invention relates to a magnetic tape cassette such as a video tape cassette.

2. Description of the Prior Art

FIG. 1 is a schematic view of the conventional magnetic tape cassette wherein reels (4), (5) holding a wound magnetic tape (3) are placed in the casing assembly comprising an upper half casing (1) and a lower half casing (2); tape guides (6), (7), (8) for guiding the magnetic tape (3) and a tape pad (9) etc. are placed in the running path of the magnetic tape (3) in the front of the casing between the reels (4), (5) so that the magnetic tape (3) can continuously run in contact with the tape guides (6), (7), (8) and the tape pad (9) to be wound on the reels; and a front cover (10) is mounted in the casing assembly so as to cover the front part of the casing assembly which provides a tape running plane for the magnetic tape (3). The front cover is used to protect the magnetic tape (3) and is usually secured through a locking means (not shown) and covers the magnetic tape (3) running in front of the casing assembly. When the casing assembly is fitted to the video deck set, the locking means is released to turn the cover over the upper half casing so that the running surface of the magnetic tape (3) is exposed to the front surface of the casing assembly; thus the cover is fitted to the upper half casing so as to be capable of opening and closing.

FIG. 2 is a schematic view showing an assembly of the upper half casing (1) and the front cover (10) wherein the front cover (10) is provided with supporting members (11), (12) projecting at both ends and pivot pins (13), (14) are provided on the supporting members (11), (12) so as to project inward at positions facing each other.

The front cover (10) can be mounted to the upper half casing as follows. A coil spring (15) is fitted to the pivot pin (13); the pivot pin (14) is loosely fitted into a hole (16) formed in the front side portion of the upper half casing, while the end portion (15a) of the coil spring (15) is brought into contact with the bottom surface of the upper half casing; thus the front cover is settled in the front portion of the upper half casing.

FIGS. 3A, 3B and 3C are schematic views showing an assembled structure of the upper half casing (1) and the front cover (10) in detail. In FIGS. 3A and 3B, a rectangular groove (17) is formed at the corner of the bottom surface of the upper half casing (1) corresponding to the position of the pivot pin (13) of the front cover (10) and a blade-like edge portion (18) is formed in front of the rectangular groove (17). The pivot pin (13) of the front cover (10) holds the coil spring (15) whose end portion (15) extends to engage with a recess (20) formed in the side wall portion (19) of the front cover (10) and the other end portion (15b) of the coil spring (15) is secured in the axial slit (13a) formed in the shaft (13) whereby the end portion (15a) of the coil spring (15) is brought into press-contact with the recess (20) by its spring action.

When the upper half casing (1) and the front cover (10) with the structures described above are combined together, the front cover (10) is moved in the direction P, as shown in FIGS. 3A and 3B, so that the front edge (18) of the upper half casing (1) is inserted between the end portion (15a) of the coil spring (15) and the side wall portion (19) to cause the end portion (15a) of the coil spring (15) to transfer from the recess (20) of the front cover (10) to the surface of the front edge (18) of the uper half casing (1) and finally, the end portion (15a) of the coil spring (15) settles in the rectangular groove (17) of the upper half casing.

The conventional magnetic tape cassette has no restricting means for preventing the side-shifting of the end portion (15a) caused when the end portion (15a) of the coil spring (15) is transferred from the front cover (10) to the rectangular groove (17). Accordingly, the end portion (15a) can not, sometimes, enter into the groove (17) and is deviated outside the groove (17) as shown by dotted line Q in FIG. 3C. The deviation of the coil spring (15) may cause a fault of the locking means (not shown) which prevents the opening of the front cover (10).

SUMMARY OF THE INVENTION

It is an object of the present invention to overcome the disadvantage of the conventional device and to provide a magnetic tape cassette having a structure for positioning safely the end portion of a coil spring in a rectangular groove of an upper half casing.

The foregoing and other objects of the present invention have been attained by providing a magnetic tape cassette comprising a tape running plane for a magnetic tape provided in the front of the casing assembly consisting of an upper half casing and a lower half casing, said magnetic tape being held in wound form and being capable of running inside the casing assembly and a front cover mounted to the casing assembly so as to open and close at the front of the assembly, said front cover being actuated by spring action in the direction closing the front part of the casing assembly by positioning one end of a coil spring fitted to the pivot pin in a rectangular groove formed in an inner surface of the upper half casing, wherein a rib having a slanted surface which is lowered toward said groove is provided at the side of said groove.

BRIEF DESCRIPTION OF THE DRAWINGS

FIG. 3A is an enlarged and partially removed plane view of the conventional magnetic tape cassette;

FIG. 3B is a cross sectional view taken along line B—B of FIG. 3A;

FIG. 3C is an enlarged and partially removed plane view of the conventional magnetic tape cassette in an assembled state;

FIG. 4A$_1$ is an enlarged and partially removed plane view showing the structure of a magnetic tape cassette of the present invention;

FIG. 4B$_1$ is a cross sectional view taken along line B$_2$—B$_2$ of FIG. A$_1$;

FIG. 4A$_2$ is a partially removed plane view of the magnetic tape cassette of the present invention in an assembled state; and FIG. 4B$_2$ is a cross sectional view taken along the line B$_3$—B$_3$ of FIG. 4A$_2$.

DETAILED DESCRIPTION OF THE PREFERRED EMBODIMENTS

Figure 1:
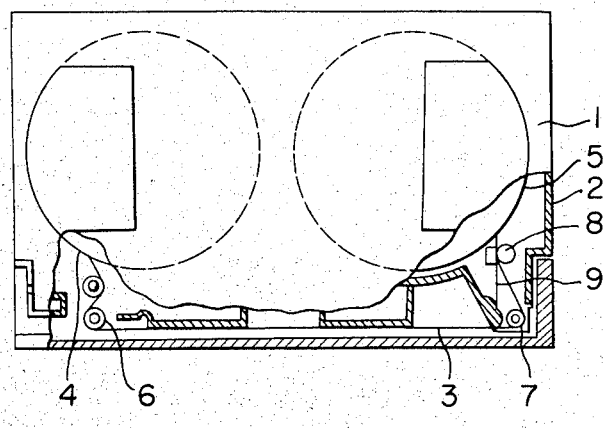
FIG. 1 is a partially sectional plane view of the conventional magnetic tape cassette.

Referring to the drawings, an embodiment of the present invention will be described.

Figure 2:
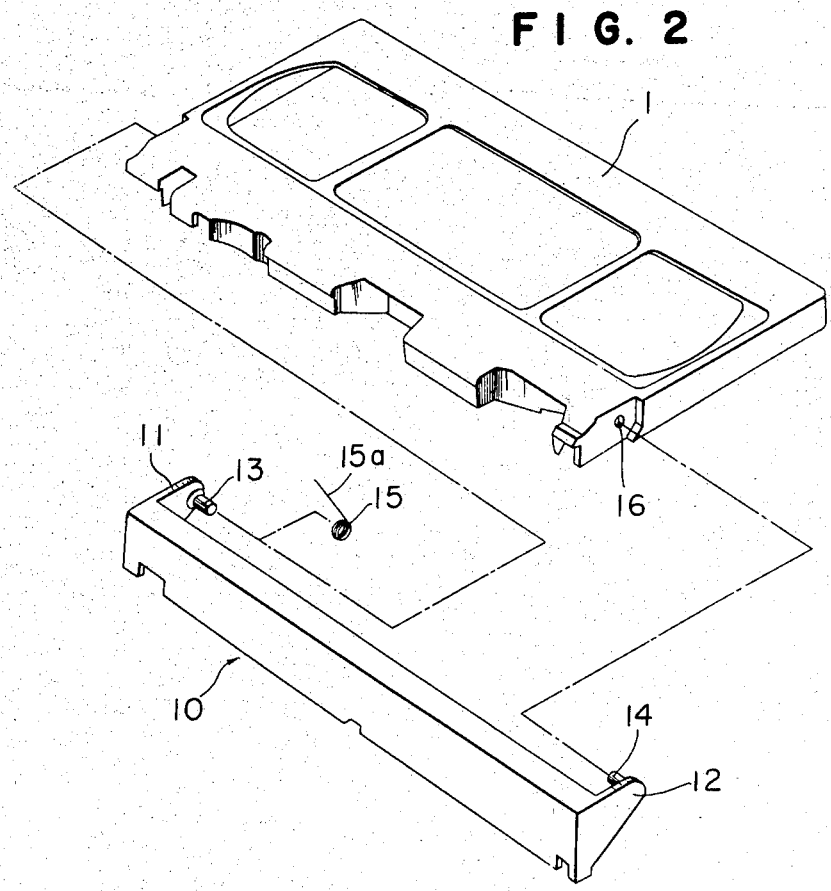
FIG. 2 is a schematic view showing structures of an upper half casing and a front cover in a disassembled state.

FIG. $4A_1$ is a plane view showing a structure of the important part of a magnetic tape cassette of the present invention as well as showing how assembling is performed; FIG. $4B_1$ is a cross sectional view taken along line $B_2$—$B_2$ of FIG. $4A_1$; FIG. $4A_2$ is a plane view of important parts in assembled state and FIG. $4B_2$ is a cross sectional view taken along line $B_3$—$B_3$ of FIG. $4A_2$. In FIG. 4, the same reference numerals designate elements having the same function as those of FIGS. 1 to 3. In this embodiment, a triangle-shaped rib (22) having a slanted surface (21) which is lowered toward a rectangular groove (17) is provided in one side portion of the rectangular groove (17) formed in an inner surface of the upper half casing (1), in one piece.

In this embodiment having the rib (22), when the front cover (10) is moved to the upper half casing (1) in the arrow direction P to assemble them as shown in FIGS. $4A_1$ and $4B_1$, the end portion (15a) of the coil spring (15) is guided by the slanted surface (21) of the rib (22) to enter the rectangular groove (17) of the upper half casing (1) so that the end portion (15a) of the coil spring (15) is securely fitted in the groove (17) when assembled as shown in FIGS. $4A_2$ and $4B_2$ and no deviation of the end portion occurs unlike in the conventional magnetic tape cassette. Accordingly, the assembly work for the upper half casing (1) and the front cover (10) can be easy and reliable and no fault of the locking means occurs. Two or more of the rib (22) can be used and the ribs can be used at both sides of the rectangular groove.

As described above, a magnetic tape cassette of the present invention comprises a tape running plane for a magnetic tape provided in the front of the casing assembly consisting of an upper half casing and a lower half casing, said magnetic tape being held in wound form and being capable of running inside the casing assembly and a front cover mounted to the casing assembly so as to open and close at the front of the assembly, said front cover being actuated by spring action in the direction closing the front part of the casing assembly by positioning one end of a coil spring fitted to the pivot pin in a rectangular groove formed in an inner surface of the upper half casing, where a rib having a slanted surface which is lowered toward said groove is provided at the side of said groove. Accordingly, the one end portion of the coil spring can be certainly guided in the groove along the slant surface of the rib so that the assembly work can be easy and reliable and no fault of a locking means occurs.

We claim:

1. In a magnetic tape cassette comprising a tape running plane for a magnetic tape provided in the front of the casing assembly consisting of an upper half casing and a lower half casing, said magnetic tape being held in wound form and being capable of running inside the casing assembly and a front cover mounted to the casing assembly so as to open and close at the front of the assembly, and front cover being actuated by spring action in the direction closing the front part of the casing assembly by positioning one end of a coil spring fitted to the pivot pin in a rectangular groove formed in an inner surface of the upper half casing, an improvement characterized in that a rib having a slanted surface which is lowered toward said groove is provided at the side of said groove.

2. A magnetic tape cassette according to claim 1 wherein two or more of said ribs are provided in the upper half casing.

3. A magnetic tape cassette according to claim 1 wherein said ribs are provided at both sides of the rectangular groove.

* * * * *